2,900,360
Patented Aug. 18, 1959

2,900,360

PROCESS FOR POLYMERIZING ETHYLENICALLY UNSATURATED COMPOUNDS USING A SULFUR CONTAINING CATALYST

Robert Schmitz-Josten, Bergheim (Erft), Germany, assignor to Farbenfabriken Bayer Aktiengesellschaft, Leverkusen, Germany, a corporation of Germany No Drawing. Application May 24, 1955
Serial No. 510,838

Claims priority, application Germany May 28, 1954

4 Claims. (Cl. 260—45.4)

The present invention relates to the polymerization of polymerizable organic compounds, such as compounds containing one or more ethylenically unsaturated double bonds.

It has been found that such polymerizable organic compounds may be polymerized with the aid of catalysts of the formula $$R-X-\underset{\underset{R_2}{|}}{\overset{\overset{R_1}{|}}{C}}-\underset{R_4}{\overset{R_3}{C}}H$$

in which R stands for an organic group such as an aryl-, alkyl-, aralkyl-, hydroaromatic or heterocyclic group. X represents sulphur or a $SO_2$ group. $R_1$ and $R_2$ stand for hydrogen or an organic group such as alkyl, aryl, aralkyl. $R_3$ and $R_4$ represent negative groups by which the hydro-atom of the neighbouring carbon atom is activated, such as $COR$, —$COOR$, —$CN$, —$SO_2R$ groups (R being the same as above). $R_3$ and $R_4$ may also belong to a ring system such as a cyclohexanedione or a cyclopentanedione ring.

Among the compounds forming this class, there are to be particularly mentioned:

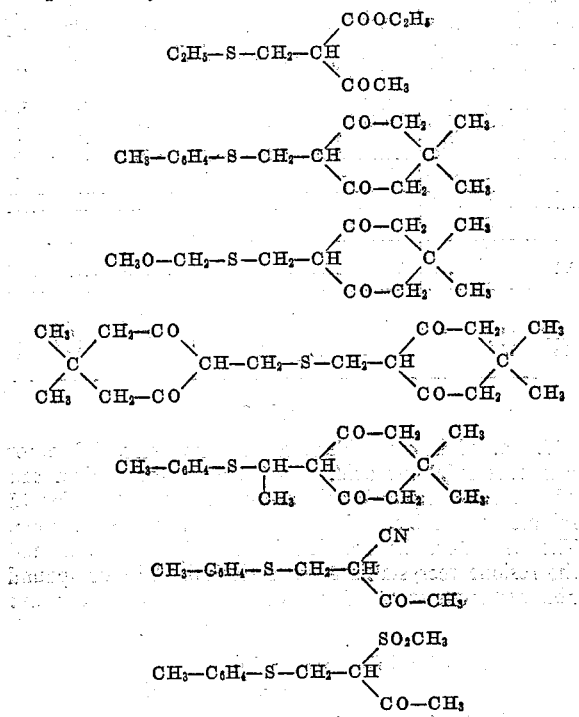

and also the corresponding sulphones. These compounds may be prepared, for example, by addition of mercaptans to the corresponding α,β-unsaturated compounds such as α-methylene-acetoacetic acid ester or ethylidene-cyanoacetic acid ester and subsequent oxidation to form the corresponding sulphones. Moreover, these compounds may also be prepared by addition of hydroxymethyl sulphides, such as a compound of the formula $$C_2H_5-S-CH_2OH$$

hydroxy methyl sulphones and also chloromethyl sulphides to compounds having movable hydrogen, such as acetoacetic acid esters, dimedone, cyclopentanone carboxylic acid esters in the presence of acids, such as hydrochloric acids. Furthermore, these compounds may be obtained by reacting a sulfinic acid, such as p-toluenesulphinic acid with the aforementioned α,β-unsaturated compounds, if desired in the presence of a solvent and of a basic catalyst.

There are many exceptionally stable and storable compounds among the large number of these novel polymerization activators. They have a comparatively high activating effect on the polymerization. By addition of basically acting compounds, the polymerization velocity may be increased to an exceptional degree. By basically acting compounds, there are to be understood inorganic and organic compounds, such as, for example, primary, secondary and tertiary amines, ammonia or quaternary ammonium bases or sulphonium bases, which may also be used in the form of their carboxylic acid salts. Such compounds are for instance tertiary butylamine, morpholine, triethanolamine, benzyltrimethyl-ammonium hydroxide, or the salts of these compounds with acetic acid, methacrylic acid, stearic acid or other acids. Moreover, the polymerization velocity may be increased by adding water, alcohols, such as methanol, mercaptan, β-dicarbonyl compounds, such as acetic acid ester, dimedone, carboxylic acids, such as methacrylic acid, stearic acid, carboxylic acid imides, dicarboxylic acid imides, such as succinimides or phthalimides, carboxylic acid amides such as acrylic acid amide.

It is obvious that the novel accelerators may also be used in combination with catalysts giving off oxygen, such as benzoyl peroxide, etc.

Suitable compounds to be polymerized with the aid of the above catalysts are for instance styrene, acrylic acid or methacrylic acid or esters thereof, such as methyl-, butyl-, dodecyl- or higher alkylesters, acrylonitrile, vinylchloride, organic vinylesters such as vinylacetate, butadiene, derivatives of butadiene, or mixtures of these compounds. The novel catalysts are also suitable for use with the copolymerization of vinyl compounds such as styrene with polyesters containing ethylenic double bonds, for example, of polyhydric alcohols and α-, β-ethylene dicarboxylic acids such as maleic acid, maleic acid anhydride, fumaric acid. Suitable monomers of this type are for instance disclosed in U.S. Patent No. 2,255,313.

The catalysts may be applied in quantities amounting to about 0.5–5 percent by weight calculated on the amount of monomer used. The polymerization may be carried out at room temperature that is to say 15–25° C. or at higher temperatures.

These accelerators have proved to be particularly suitable for the manufacture of dental plastics in which polymers are mixed with liquid polymerizable organic compounds and then polymerized. The esters of methacrylic acid may be mainly considered for this process. Since the sulphones among these accelerators have proved to be stable with respect to compounds giving off oxygen, the possibility exists, for example, of polymeric methyl methacrylate power being mixed with these sulphones and an agent giving off oxygen, such as benzoyl peroxide, and then stored. If a basically acting compound is added to monomeric methyl methacrylate, such a high polymerization velocity is obtained by mixing polymer powder and liquid, both of which are substantially stable, that final polymerization of the monomeric methyl methacrylate is produced without application of heat.

*Example 1*

The efficacy of the novel accelerators and their action in accelerating polymerization is shown, for example, as follows: 3 g. of a fine granular pearl polymer of 90% methyl methacrylate and 10% of the methyl ester of acrylic acid are mixed with 0.1 to 0.2 millimol of one of the novel accelerators and 0.1 to 0.2 g. of tertiary butyl permaleic acid. They are then mixed by stirring with 2 cc. of a monomer having a composition as indicated in the tables. The initial temperature of the mixture is 20 to 22°. The spontaneous heating of the samples due to the heat of polymerization being liberated is followed as a function of time. The tables indicate the commencement of polymerization, and also the highest temperature reached during polymerization. The final hardening of the samples was completed 15 to 30 minutes after reaching the maximum temperature.

The following accelerators were used:

(1) 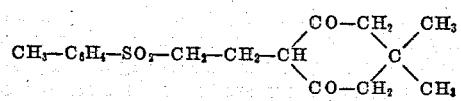

Melting point 175° C. (with decomposition)

prepared by dissolving 1.5 g. of 5.5.-dimethyl-1.3-cyclohexanedione and 1.9 g. of p-toluyloxymethylsulphone in 20 cc. of tetrahydrofurane, adding 0.1 g. of metallic sodium and keeping the mixture 2 days at 20° C. Thereafter the solvent is evaporated under vacuum and the residue is treated with 2 cc. of normal hydrochloric acid and a little ice. There are obtained 2 g. of a crude product which is crystallized from alcohol, whereby the compound of the above formula is separated from methylene-bis-dimethyl-cyclohexandione which is formed as a by-product.

(2) 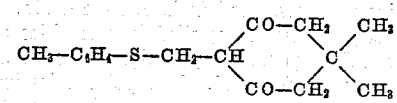

Melting point 153° C.

prepared from formaldehyde, a semi-mercaptal of p-thio-cresol and the sodium salt of dimedone.

(3) 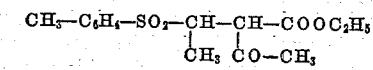

Melting point 86° C.

prepared by dissolving 5 g. of p-toluensulfinic acid in 20 cc. of alcohol and adding 5 g. of ethylideneacetoacetic acid ethylester. The reaction takes place with self-heating. The reaction product crystallizes after cooling the solution. The compound obtained is recrystallized from alcohol.

(4) 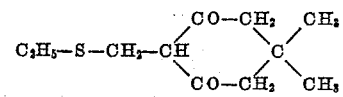

Melting point 134° C.

36 cc. of a 30% aqueous formaldehyde solution and a solution of 42 g. of 5.5.-dimethyl-cyclohexane-1.3-dione in 100 cc. of methanol and 29.5 cc. of 10 normal NaOH are added one after the other to a solution of 17.5 g. of ethylmercaptane. To the solution then obtained there is added a mixture of 295 cc. of 1 normal hydrochloric acid and 100 cc. of methanol during three hours until the pH value of the mixture is 4. The mixture is diluted with water and the reaction product is sucked off, whereafter the latter is dried and mixed with 700 cc. of benzene in order to remove methylene-bis-dimethylcyclohexandione which has formed as a by-product. The product obtained is recrystallized from alcohol.

(5) 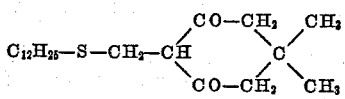

Melting point 97° C.

prepared from dodecyl mercaptan, formaldehyde and dimedone.

(6) 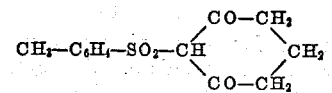

Melting point 169° C. (with decomposition)

prepared from p-toluyl-hydroxymethyl-sulphone and dihydroresorcin with some metallic sodium.

The effects obtained with the different accelerators are shown in the following table.

The powder contains:

| | | | | | | | | | | | | | | | | |
|---|---|---|---|---|---|---|---|---|---|---|---|---|---|---|---|---|
| Pearl polymer, g | 3 | 3 | 3 | 3 | 3 | 3 | 3 | | 3 | 3 | 3 | 3 | 3 | 3 | 3 | 3 |
| Tertiary butyl permaleic acid, g | 0.16 | 0.16 | 0.16 | 0.16 | 0.16 | 0.16 | 0.16 | | 0.16 | 0.16 | 0.16 | 0.16 | 0.16 | 0.16 | 0.16 | 0.16 |
| Compound number | 1 | 1 | 1 | 1 | 1 | 1 | 1 | | 2 | 3 | 4 | 5 | 5 | 2 and 5 | 7 | 7 |
| Amount in g | 0.06 | 0.06 | 0.06 | 0.06 | 0.06 | 0.06 | 0.06 | | 0.03 | 0.06 | 0.02 | 0.07 | 0.07 | { 0.015 / 0.05 } | 0.06 | 0.06 |
| The liquid consists of: | | | | | | | | | | | | | | | | |
| Methyl methacrylate cc | 1.6 | 1.6 | 1.8 | 1.8 | 1.8 | 1.8 | 1.8 | | 1.6 | 1.99 | 1.6 | 1.6 | 1.6 | 1.6 | 1.6 | 1.6 |
| Methacrylic acid, cc | 0.04 | 0.04 | 0.02 | 0.02 | 0.02 | 0.02 | 0.02 | | 0.4 | 0.01 | 0.4 | 0.4 | 0.4 | 0.4 | 0.4 | 0.4 |
| Dimedone, g | 0.03 | 0.03 | 0.03 | 0.03 | | 0.03 | 0.03 | | 0.03 | 0.03 | 0.03 | 0.03 | 0.03 | 0.03 | 0.03 | 0.03 |
| Morpholine, g | 0.02 | 0.02 | | | | | | | 0.02 | | 0.01 | 0.02 | 0.02 | 0.02 | 0.02 | 0.02 |
| Diethylamine, g | | | 0.03 | | | | | | | 0.0075 | | | | | | |
| Diethanolamine, g | | | | 0.02 | 0.02 | | | | | | | | | | | |
| Triethanolamine, g | | 0.015 | 0.015 | | | | | | 0.015 | | 0.01 | | 0.015 | | | |
| Ammonium methacrylate, g | | | | | | | 0.02 | | | | | | | | | |
| NH₄ salt of maleic mono-dodecyl ester, g | | | | | | 0.1 | | | | | | | | | | |
| Phthalimide, g | | | 0.05 | | | | | | | | | | | | | 0.100 |
| Commencement of polymerizat., min | 6 | 7.5 | 8.5 | 9.5 | 9 | 10 | | 12 | 9 | 7 | 15 | 16 | 10 | 7 | 9 | 10 |
| Maximum temp., degrees | 71 | 82 | 80 | 76 | 75 | 78 | | 84 | 60 | 70 | 42 | 47 | 50 | 54 | 76 | 80 |
| Reached in min | 10 | 9 | 12 | 12 | 13 | 12 | 13 | 15 | 12 | 12 | 18 | 22 | 14 | 11 | 12 | 12 |

*Example 2*

3.4 g. of isopropylidene acetoacetic ester, 3.2 g. of p-toluene sulphinic acid, and 0.2 g. of the sodium salt of p-toluene sulphinic acid are heated to 70° C. for 15 minutes and mixed with 20 cc. of ether after cooling. The next day, the solution is filtered, evaporated and the residue recrystallized from alcohol. The compound obtained melts at 92° C. and corresponds to the formula:

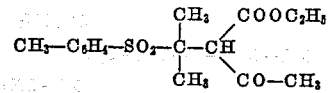

Polymerization test: 3 g. of a pearl polymer of methacrylic acid methylester are mixed with 0.04 g. of the above sulphone and 0.07 g. of tertiary butyl permaleic acid. Thereupon 0.02 of morpholine and 0.01 g. of methacrylic acid are dissolved in 1.9 cc. of monomeric methyl methacrylate. By stirring the powder with the liquid, polymerization takes place within 9 minutes.

*Example 3*

1 g. of ethylidene malonitrile are mixed with 2 g. of p-toluene sulphinic acid. The reaction sets in with a substantial increase in temperature. The reaction product crystallizes upon cooling and is purified by recrystallizing it from methanol. The compound corresponds to the formula:

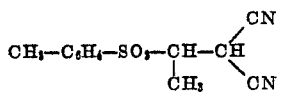

melting point: 96° C.

Polymerization test: An intimate mixture consisting of 0.06 g. of the above sulphone, 0.1 g. of benzoyl peroxide and 3 g. of polymethacrylic acid methyl ester in the form of pearls, is mixed with stirring with 2 cc. of a saturated solution of methacrylic acid amide in monomeric methacrylic acid methyl ester. The mixture hardens within 25 minutes with spontaneous heating.

*Example 4*

12 g. of ethylidene cyanoacetic acid methyl ester and 15 g. of p-toluene sulphinic acid are dissolved in 30 cc. of ether and the solution is refluxed for 10 minutes. Crystallization sets in upon cooling. The reaction product of the formula

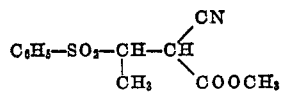

melts at 116° C. after recrystallizing from methanol.

Polymerization test:

(a) 1 g. of this sulphone is dissolved in 100 g. of a mixture consisting of 70 g. of a polyester in 30 g. of styrene. The polyester was prepared by esterifying 1 mol of phthalic acid anhydride, 1 mol of maleic anhydride, 1 mol of ethylene glycol and 1 mol of diethylene glycol by heating these components at 210° C. in a $CO_2$ atmosphere until the acid number of the reaction product is 8.1. By the addition of 2 g. of benzoyl peroxide the mixture hardens within 60 minutes with an increase of temperature of up to 150° C. By using 1 g. of tertiary butyl hydroperoxide, instead of benzoyl peroxide, the temperature is raised to about 170° C. already after 45 minutes.

(b) In order to polymerize methacrylic acid methyl ester, 0.08 g. of the above sulphone of the melting point 116° C. are mixed with 2 cc. of methacrylic ester methylester and 3 g. of a pearl polymer. By addition of 0.1 g. of benzoyl peroxide, polymerization takes place within 20 minutes.

*Example 5*

29 g. of ethylidene acetoacetic acid methyl ester, thereafter 40 cc. of 10 normal sulphuric acid are added dropwise with stirring to a solution of 90 g. of the sodium salt of hydroxy methyl sulphinic acid,

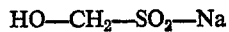

in 100 cc. of water. After stirring for 30 minutes the resulting oil is taken up in ethyl acetate, the organic layer is dried with anhydrous sodium sulphate and evaporated. The residue slowly crystallizes upon addition of ether. The crystals are recrystallized from methanol and melt at 151° C.

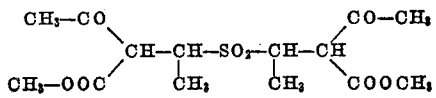

Polymerization test: 0.1 g. of this sulphone and 0.07 g. of tertiary butyl permaleic acid are mixed with 3 g. of polymethacrylic acid methyl ester in the form of pearls. Upon addition of a solution of 0.01 g. of benzyl trimethyl ammonium hydroxide and 0.1 cc. of methacrylic acid in 1.9 cc. of methacrylic acid methyl ester, the mixture hardens within 8 minutes.

*Example 6*

105 g. of sodium hyposulphite ($Na_2S_2O_4.2H_2O$) are dissolved in 500 cc. of water and 120 cc. of acrylonitrile are added. The mixture is stirred at 25° C. for 60 minutes, adjusted to a pH value of 8–9 by addition of dilute sulphuric acid and then heated to 60° C. for two hours. The excess acrylonitrile is removed by extracting with ether. The aqueous layer is treated with animal charcoal and then filtered. The layer contains a mixture of equimolecular quantities of the sodium salts of cyano ethyl sulphinic acid and cyano ethyl sulphonic acid. 70 g. of ethylidene acetoacetic acid ethylester and 50 cc. of 10 normal sulphuric acid are added to the solution with cooling and vigorous stirring. After the reaction has subsided, another 50 cc. of 10 normal sulphuric acid are added and stirring is continued for 30 minutes. The oily reaction product is taken up in benzene, washed with water and dried. After distilling off the benzene in vacuum, the residue is dissolved in tetrahydrofurane and the solution is caused to crystallize by the addition of ether. The crystals are subsequently recrystallized from alcohol. Yield: 140–160 g. The compound

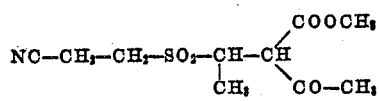

melts at 71° C.

Polymerization test: A mixture consisting of 0.08 of this sulphone, 0.05 g. of tertiary butyl permaleic acid, 0.05 g. of tetrahydrophthalimide and 3 g. of a pearl polymer of methacrylic acid methylester is mixed with stirring with 2 cc. of monomeric methacrylic acid methylester. The product hardens completely within a few minutes.

What I claim is:

1. A process of polymerizing ethylenically unsaturated polymerizable compounds which comprises contacting said ethylenically unsaturated compounds with a polymerization catalyst comprising a compound of the formula:

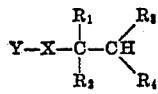

in which each of $R_1$ and $R_2$ represents a member of the group consisting of hydrogen and alkyl radicals. X represents a member of the group consisting of sulfur and $SO_2$, each of $R_3$ and $R_4$ represents a radical selected from the group consisting of —COZ, —COOZ, —CN and $SO_2Z$, wherein Z is a monovalent alkyl radical and $R_3$ and $R_4$ taken together represent a cycloaliphatic ring system containing two CO-groups which latter are bonded to the carbon of the

group, and Y represents a member of the group consisting of an aryl radical, an alkyl radical, and

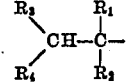

2. Process of claim 1 wherein the polymerization is conducted in a homogeneous phase.

3. Process of claim 1 wherein said polymerization catalyst is employed in combination with a peroxidic catalyst.

4. Process of claim 1 wherein said ethylenically unsaturated compounds are contacted with said polymerization catalyst at room temperature.

References Cited in the file of this patent

UNITED STATES PATENTS

| | | |
|---|---|---|
| 2,354,234 | Walter et al. | July 25, 1944 |
| 2,434,054 | Roedel | Jan. 6, 1948 |
| 2,462,354 | Brubaker et al. | Feb. 22, 1949 |
| 2,474,808 | Schoene | July 5, 1949 |
| 2,537,892 | Harris | Jan. 9, 1951 |
| 2,573,580 | Ladd | Oct. 30, 1951 |
| 2,610,202 | Kosmin et al. | Sept. 9, 1952 |
| 2,700,671 | Hafliger | Jan. 25, 1955 |
| 2,750,357 | Bredereck | June 12, 1956 |